United States Patent
Henry

(10) Patent No.: US 7,312,871 B2
(45) Date of Patent: Dec. 25, 2007

(54) METHOD AND APPARATUS FOR ALIGNMENT OF COMPONENTS

(75) Inventor: Richard W. Henry, West Chester, OH (US)

(73) Assignee: A.P. Fixturlaser AB, Mölndal (SE)

( * ) Notice: Subject to any disclaimer, the term of this patent is extended or adjusted under 35 U.S.C. 154(b) by 395 days.

(21) Appl. No.: 10/491,988

(22) PCT Filed: Apr. 22, 2003

(86) PCT No.: PCT/SE03/00633

§ 371 (c)(1),
(2), (4) Date: Apr. 7, 2004

(87) PCT Pub. No.: WO03/089875

PCT Pub. Date: Oct. 30, 2003

(65) Prior Publication Data

US 2004/0252302 A1 Dec. 16, 2004

(30) Foreign Application Priority Data

Apr. 22, 2002 (SE) .................................. 0201224

(51) Int. Cl.
*G01B 11/26* (2006.01)
*G01B 11/00* (2006.01)
*G01C 1/00* (2006.01)
(52) U.S. Cl. ....................... 356/400; 356/138; 356/399
(58) Field of Classification Search ............. 356/152.1, 356/153.3, 153, 400; 33/228, 250, 286, 661
See application file for complete search history.

(56) References Cited

U.S. PATENT DOCUMENTS

| | | | |
|---|---|---|---|
| 3,704,522 A | 12/1972 | Blubaugh et al. | |
| 4,516,328 A * | 5/1985 | Massey | 33/645 |
| 4,709,485 A * | 12/1987 | Bowman | 33/228 |
| 5,077,905 A * | 1/1992 | Murray, Jr. | 33/412 |
| 5,684,578 A * | 11/1997 | Nower et al. | 356/141.3 |
| 5,715,609 A * | 2/1998 | Nower | 33/645 |
| 5,980,094 A * | 11/1999 | Nower | 700/279 |
| 6,040,903 A * | 3/2000 | Lysen et al. | 356/153 |
| 6,046,799 A | 4/2000 | Lysen | |
| 6,223,102 B1 * | 4/2001 | Busch | 700/279 |
| 6,411,375 B1 * | 6/2002 | Hinkle et al. | 356/152.1 |
| 6,763,597 B2 * | 7/2004 | Lysen | 33/286 |

FOREIGN PATENT DOCUMENTS

GB 2 128 324 A 4/1984

* cited by examiner

Primary Examiner—Gregory J. Toatley, Jr.
Assistant Examiner—Jarreas Underwood
(74) Attorney, Agent, or Firm—Birch, Stewart, Kolasch & Birch, LLP

(57) ABSTRACT

A method and apparatus for measuring the relative positions of first and second components, comprising: mounting first and second measurement units on respective housings forming part of each component and which are rotatably arranged and infinitely adjustable thereon in respective brackets for defining first and second adjustably selected rotational axes, respectively; measuring the relative positions of the components in first and second states of operation by detecting the relative positions of those selected axes in each state of operation and producing measurement values determinative of those relative positions.

16 Claims, 6 Drawing Sheets

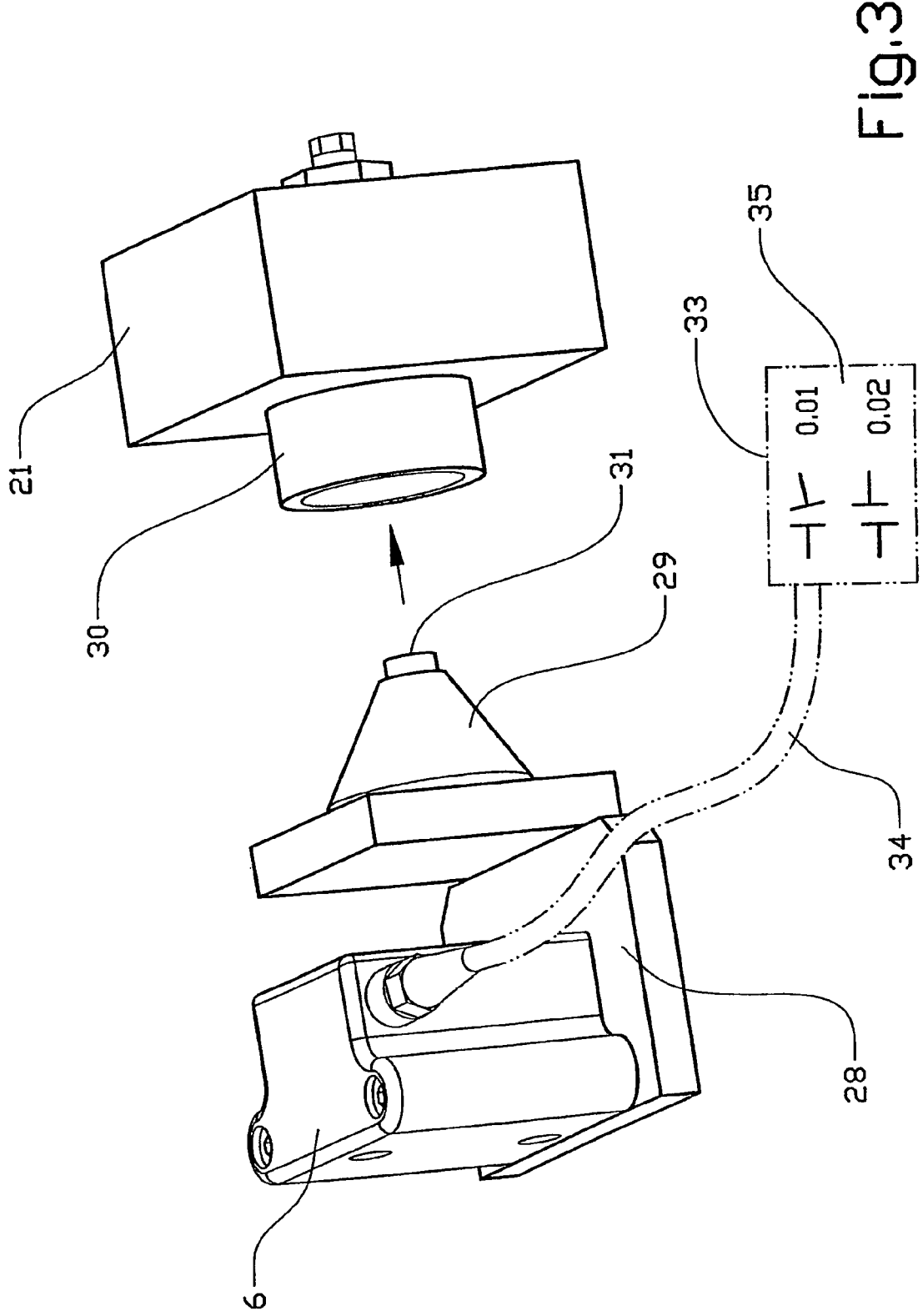

METHOD AND APPARATUS FOR ALIGNMENT OF COMPONENTS

TECHNICAL FIELD

The present invention relates to a method for measuring the relative positions of a first component and a second component. The invention can for example be applied in alignment of components, for example in the form of machines such as engines, pumps or couplings.

The present invention also relates to an apparatus for measuring the relative positions of a first component and a second component.

BACKGROUND OF THE INVENTION

In various fields of technology there is a need for correct alignment of different components and machines in relation to each other. For example, during operation of large engines, pumps and similar equipment, it is essential that an output shaft of a propelling unit, for example in the form of an engine, is correctly aligned with respect to an input shaft of a propelled unit, for example in the form of a pump. In this manner, the output power of the engine can be transferred via the rotational movement of the engine shaft to the input shaft of the pump in an optimal manner. Any misalignment of the two shafts may result in a poor efficiency and an increased risk for wear and damage to the engine or the pump.

Consequently, in the above-mentioned field of technology, there is a demand for correct alignment of the engine output shaft in relation to the input shaft of the pump. In this regard, it should be noted that the two shafts may present alignment errors of generally two different kinds. To be precise, the shafts may be disposed at a certain angle with respect to each other, which is referred to as an angular error, i.e. a "horizontal angular error" and a "vertical angular error". Secondly, even though the shafts may be parallel to each other, they may be slightly displaced with respect to each other so that they extend along two separated directions, i.e. in a parallel manner. This is referred to as "horizontal offset" and "vertical offset". If these errors exceed predetermined limit values, it can be assumed that the shafts, and their corresponding machines, are poorly aligned with reference to each other.

Consequently, there is a general demand for systems and methods for aligning various pieces of machinery comprising rotatable shafts. Such systems and methods may be used for engines and pumps and similar equipment. Generally, they may be used in power plants, chemical plants and oil refineries, in particular in applications which comprise high speed or in applications comprising expensive, process critical machines which are necessary to align.

According to prior art, alignment of two rotatable shafts of two machines can be carried out by means of a measuring apparatus which comprises a first measuring unit arranged for mounting on a first machine and comprising a light source for generation of light radiation in the direction towards a second measuring unit arranged for mounting on a second machine and also comprising a second light source for generation of light radiation in the direction towards the first measuring unit. Furthermore, each of the measuring units comprises a detection device for emitted light radiation. By means of this apparatus, the alignment of the two shafts of the machines can be investigated.

The above-mentioned type of measuring equipment is intended to be used when the relevant machines are standing still, i.e. when they are relatively cold and not in use for the moment.

However, it should be noted that in many applications, the alignment between an engine and a pump, for example, may change as these machines are started and operated and gradually become hot, i.e. from cold and shutdown to normal operation. For example, the alignment may vary depending on the operating temperature of the machines. The alignment may also vary depending on changes in discharge pressure (if alignment is carried out on a pump or a compressor). Also, piping strain in the shafts may cause changes in alignment between cold and hot operating conditions.

The change in alignment between a cold and a hot condition may also be influenced if the relevant machines operate in parallel, or if any changes in electrical loading or rotational forces should occur during operation.

Consequently, there are thermal factors and other parameters which affect the alignment of the machines. In particular, as explained above, a problem exists in that a correct alignment of a still-standing machine may not necessarily correspond to a correct alignment of the same machine when it is operated. This means that it will be necessary to carry out some type of adjustments in order to compensate for the fact that alignment changes will occur between a cold and a hot condition.

A previously known system for measuring the difference in alignment from a cold start condition to a hot operating condition is manufactured by the company Prüftechnik and comprises two units constituting combined transmitters and detectors to be mounted on a first, stationary machine, suitably on a bearing housing on said first machine. The transmitters comprise laser light sources. Corresponding prisms are mounted on a second, moveable machine which is intended to be adjusted so as to obtain correct alignment.

The lasers are set up, one in the vertical plane and one in the horizontal plane. The horizontal head must point toward 3 o'clock, and the vertical head must point toward 12 o'clock. After this set up, each prisms have to be aligned to reflect its corresponding laser beam into the corresponding detector. The units comprising the transmitters and detectors are connected to a control unit which transmits the data to a computer, for example of the PC type. A particular software program is used to trend the data streaming from the transmitters and detectors. This results in measuring information in the form of graphs indicating positional changes during operation of the relevant machines.

A disadvantage with this previously known system relates to the fact that it comprises four different units which must be mounted and adjusted before measurements can be carried out. This means that this system is relatively complicated and time-consuming to set up and use. In fact, the setup of this previously known system takes an experienced user about two hours per coupling to set up. This does not include the time spent by the operator programming alignment formulas into the computer. The system also requires high amounts of training to be used properly as well as extensive knowledge of computer use for an operator. It is also relatively expensive.

A further disadvantage with this previously known system relates to the fact that a separate graph is required from each alignment parameter to be monitored. This means that on a typical single coupling measurement, four different graphs are required. This results in a time-consuming operation as well as a time-consuming and complicated evaluation of the measurement data.

Another previously known system is disclosed in U.S. Pat. No. 5,077,905, which teaches a laser alignment mount assembly comprising a first measuring unit and a second measuring unit. This known assembly is adapted for alignment of two coupled shafts during a first operational condition and a second operational condition. By means of the system, an initial "zeroing" of the equipment is carried out in said first operational condition by setting a laser beam in coincidence with a target. In this manner, a zero reference is determined. When the coupled shafts are in said second operational condition, a "re-zeroing" is made by displacing one of the measuring units so as to be aligned with the target and by mechanically measuring the positional change resulting from the movement off the zero reference point when the system enters the second operational condition.

A disadvantage with the system shown in U.S. Pat. No. 5,077,905 relates to the fact that it relies on both a laser measurement system and a mechanical measurement device to gather alignment change data, i.e. for providing the result of the above-mentioned "re-zeroing". Also, the "re-zeroing" is carried out following a mechanical manipulation of a mounting bracket.

SUMMARY OF THE INVENTION

An object of the present invention is to provide a method and apparatus, respectively, by means of which an improved measurement of the changes in relative positions of two components, in particular for carrying out shaft alignment of co-linear centers of rotation of two or more shafts, is accomplished. A particular object is to provide alignment during normal (hot) operating conditions.

The above-mentioned object is accomplished by means of a method for measuring the relative positions of a first component and a second component, said method comprising: mounting a first measurement unit on a housing forming part of said first component by means of a first bracket, said first measurement unit being rotatably arranged in relation to said first bracket and defining a first rotational axis; and mounting a second measurement unit on a further housing forming part of said second component by means of a second bracket, said second measurement unit being rotatably arranged in relation to said second bracket and defining a second rotational axis. The method according to the invention further comprises: measuring, in a first state of operation of said first component and said second component, the relative position of said first component in relation to said second component by detecting the position of said first axis and by detecting the position of said second axis; providing measurement values corresponding to the positions of said first rotational axis and said second rotational axis, measuring, in a second state of operation of said first component and said second component, the relative position of said first component in relation to said second component by detecting the position of said first axis and by detecting the position of said second axis; and obtaining information related to the relative positions of said first component in relation to said second component based on the measurements made in said first state of operation and the measurements made in said second state of operation.

The above-mentioned object is also accomplished by means of an apparatus for measurements of the relative positions of a first component and a second component by means of a first measurement unit and a second measurement unit, said apparatus comprising: a first bracket for mounting the first measurement unit on a housing forming part of said first component; a second bracket for mounting the second measurement unit on a further housing forming part of said second component; each measurement unit being fixedly mounted on a rotatable element which is arranged in each corresponding bracket, thereby defining a first rotational axis for the first measurement unit in relation to the first bracket and a second rotational axis for the second measurement unit in relation to the second bracket. According to the invention, said measurement units are adapted for measuring, in a first state of operation of said first component and said second component, the relative positions of said first component in relation to said second component by detecting the position of said first axis and by detecting the position of said second axis, and for measuring, in a second state of operation of said first component and said second component the relative positions of said first component in relation to said second component by detecting the position of said first axis and by detecting the position of said second axis.

An important advantage with the present invention is that it constitutes a simple solution which is also compact and easy to operate. In particular, the system according to the invention is easy to set up, mount and break down. The invention also provides very accurate alignment with the user of relatively simple, visible laser system. The system according to the invention is easy to install and easy to adjust prior to actual measurements. Furthermore, the system according to the invention requires no particular computer programming for the operator using it, and consequently constitutes a user-friendly system.

A particular advantage of the invention relates to the fact that it allows the use of measurement equipment of the same kind as used during normal shaft alignments at a single operating condition (normally a cold, non-operative state). The invention also allows the same measuring process as according to prior art to be used when carrying out the present invention. The invention can be adapted to all measurements units which are available on the market today, which means that the invention constitutes a simple and flexible solution.

BRIEF DESCRIPTION OF THE DRAWINGS

The invention will now be described with reference to a preferred embodiment and the appended drawings, in which:

FIG. 3 shows how a measurement unit according to the invention can be mounted.

PREFERRED EMBODIMENTS

Figure 1:
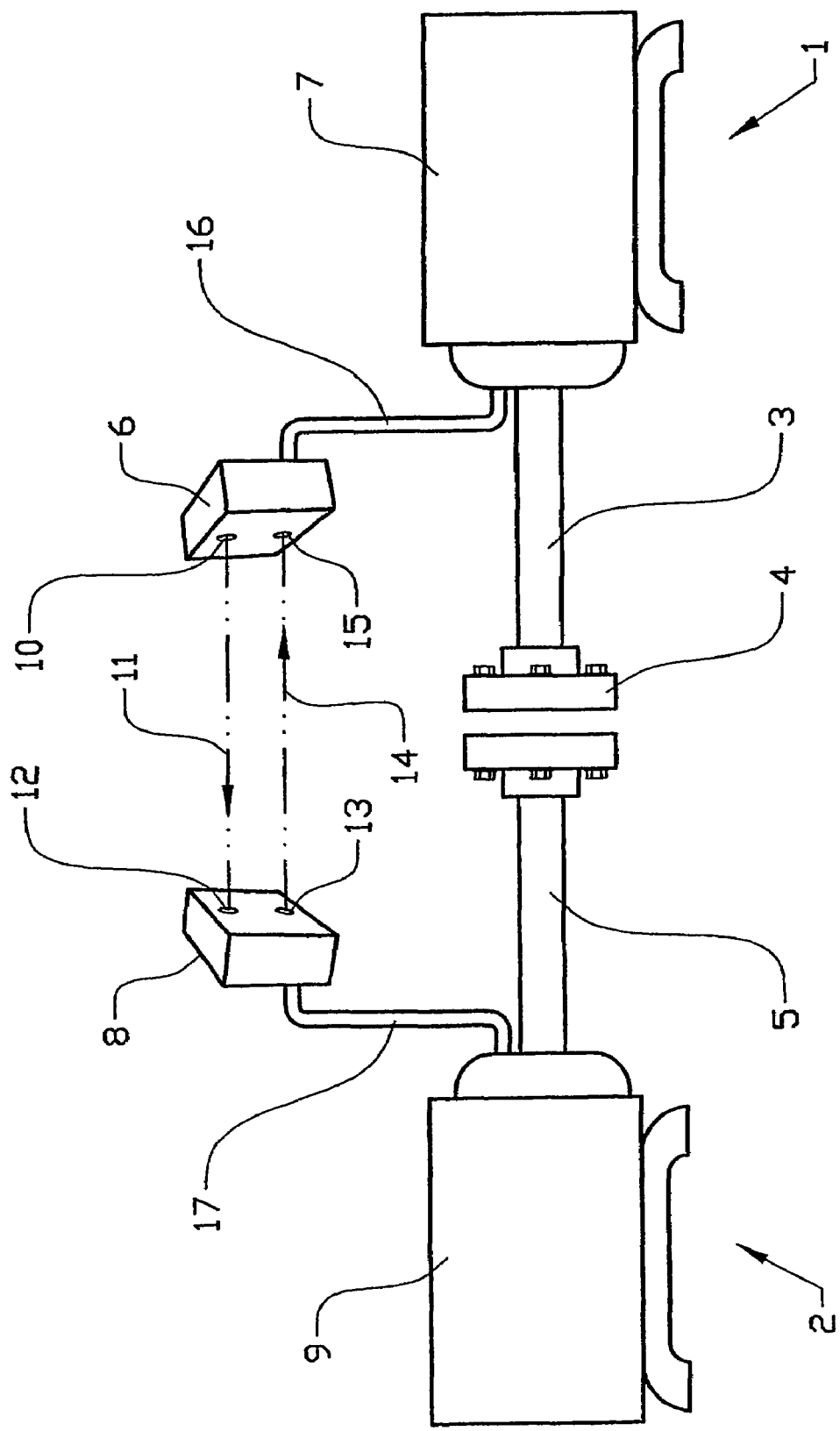
FIG. 1 shows in a schematic manner an alignment set-up in which the present invention is used.

The present invention will now be described, firstly with reference to FIG. 1, which shows in a schematic manner an arrangement in which the invention suitably can be used. Said arrangement comprises a first machine 1 which can be constituted by an engine, the output power of which is intended to be transferred to a second machine 2. Said second machine 2 is suitably constituted by a pump or some other form of propelled unit, such as for example a generator. The invention is not limited to be used with an engine and a pump, but can be implemented for all types of measurements of the relative position between a first component and a second component during various types of operational conditions.

The output power of the engine 1 is transferred to the pump 2 via an output shaft 3 of the engine 1, a coupling 4 and an input shaft 5 of the pump 2.

As mentioned initially, there is a demand for correct alignment of the engine's 1 output shaft 3 in relation to the input shaft 5 of the pump 2. In particular, the alignment can be evaluated by determining the angular errors and offset values of the two shafts 3, 5. There is also a need for determining whether these parameters are within predetermined allowed limit values.

The invention is not limited to be used with any particular type of propelling or propelled machine or other equipment. The equipment for which the invention is used does not itself form part of the invention. Generally, the invention can be used in any situation in which there is a demand for aligning two components arranged for transmitting power in any direction between the components. In particular, the invention is used for alignment of co-linear centers of rotation of two or more shafts. For example, the invention can be used for alignment of machines such as engines and pumps. The invention can also be used in situation in which no transmission of power is intended. For example, the relative position between two components (for example a machine and its support structure) can generally be measured at different states of operation.

As explained above, the invention is particularly suitable for cooperating with many different types of known measurement units. As indicated in FIG. 1, the invention may for example be used with a first measuring unit 6 which is mounted in a certain position with respect to a housing 7 of the engine 1 during alignment of the engine 1 and the pump 2. Furthermore, the apparatus according to the invention is also intended to be used with a second measuring unit 8 intended to be mounted in a position with respect to a housing 9 of the pump 2. As will be described below, the invention comprises brackets for mounting the measuring units 6, 8.

It can be noted that either one of the engine 1 and the pump 2, for example the engine 1, is stationary, i.e. it is not intended to be moved. The other apparatus, i.e. the pump 2 in this case, is movable. The invention can thus be used for an application in which a measurement unit is mounted on a stationary apparatus and another measurement unit is mounted on a movable apparatus. However, the invention is not limited to such applications, but can also be used with non-movable machines.

The first measurement unit 6 comprises a first light source 10, which is preferably a laser light source which is adapted for providing a first laser beam 11 directed towards the second measurement unit 8. For this reason, the second measurement unit 8 comprises a light detector 12 arranged for detecting any incoming light from the first light source 10. Furthermore, the second measurement unit 8 comprises a second laser light source 13 for producing a further laser light beam 14 intended to be directed towards the first measurement unit 6, in particular towards further light detector 15 arranged in said first measurement unit 6 and adapted for detecting any incoming light from the second laser light source 13.

The invention can alternatively be adapted to be used with other types of measurement units. For example, measurement units of the type which do not use laser light but some other form of light source can be used by means of the invention. The set of measurement units can be constituted by a first measurement unit comprising a light source, which cooperates with a second measurement unit comprising a light reflector. The reflected light is detected by means of a light detector on the first measurement unit. As an alternative, the detector unit may be manually operated, i.e. it may comprise a target in the form of a number of lines which are used by an operator for visually detecting whether the measurement units are aligned. As an alternative to measurements involving a light source, a mechanical alignment equipment comprising the so-called mechanical dial indicator method, can also be used with the invention.

Figure 2:
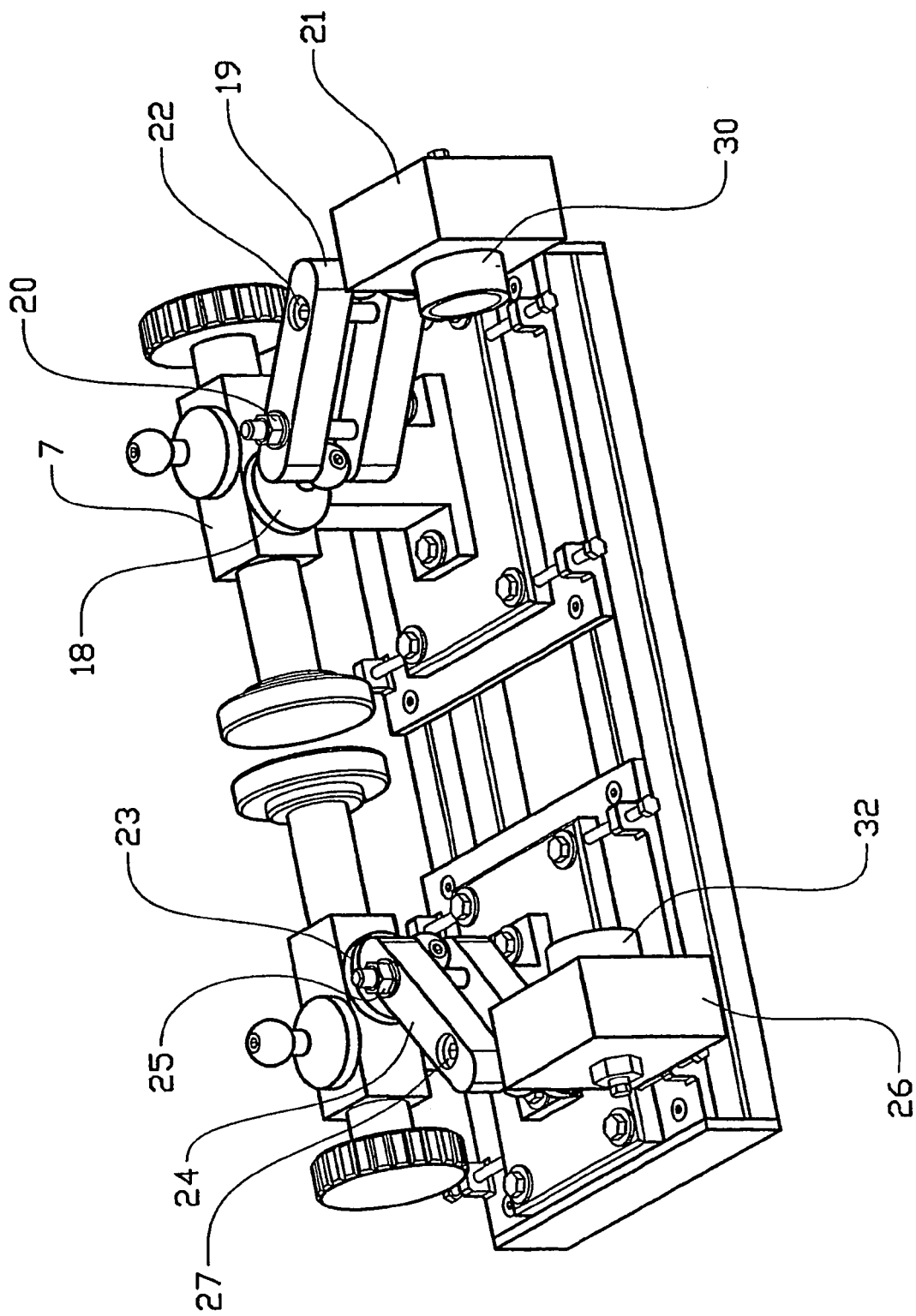
FIG. 2 shows an apparatus according to the present invention, in a partially assembled state.

The measurement units 6, 8 are mounted on the engine 1 and the pump 2, respectively, by means of a first mounting arrangement 16 and a second mounting arrangement 17, respectively. The mounting arrangements 16, 17 are indicated in a simplified and schematic manner in FIG. 1, but will now be described in greater detail with reference to FIG. 2. As indicated in FIG. 2, which shows an arrangement partly assembled, just before mounting of the measurement units 6, 8, the invention according to the preferred embodiment comprises a first mounting ball 18 which is attached to the housing 7 of the engine 1. A first mounting clamp 19 is adapted to be fastened on the mounting ball 18. In this regard, the position of the first mounting clamp 19 can be adjusted and fine-tuned, and then tightened by means of a tightening screw 20. The opposite end of the first mounting clamp 19 is intended to be fastened to a first base bracket 21. As will be described in greater detail below, the first base bracket 21 acts as a support for the first measurement unit 6. When the first base bracket 21 has been positioned in a correct position, it can be locked to the first mounting clamp 19 by means of a further tightening screw 22 in said mounting clamp 19.

In a similar manner as described above, the arrangement according to the preferred embodiment comprises a second mounting ball 23 which is attached to the housing 9 of the pump 2. A second mounting clamp 24 is arranged to be fastened on the second mounting ball 23. The position of the second mounting clamp 24 can be adjusted and fine-tuned, after which it can be tightened by means of a tightening screw 25. The opposite end of the second mounting clamp 24 is intended to be fastened to a second base bracket 26. As will be described in greater detail below, the second base bracket 26 will act as a support for the second measurement unit 8. When the second base bracket 26 has been positioned in a correct position, it can be locked to the second mounting clamp 24 by means of a further tightening screw 27 in said second mounting clamp 24.

The dimensions of the mounting clamps 19, 24 may vary, and are adapted so as to allow fine-tuning of the positions of the measurement units depending on for example the geometry of the machines. In this manner, the actual positions of the measurement units can be adapted to each situation in which the invention is used.

FIG. 3 indicates the manner in which the first measurement unit 6 is mounted in its corresponding first base bracket 21. The first measurement unit 6 is attached to a first support unit 28 which in turn is provided with a generally cone-shaped mounting member 29. This mounting member 29 is shaped so as to be fitted into a correspondingly shaped internal conical recess in a rotatable component 30 (see also FIG. 2) which is rotatably supported in the first base bracket 21. Furthermore, the measurement unit 6 with its support unit 28 are fixedly mounted in the rotatable component 30. In this manner, the first base bracket 21 constitutes a support element for the relevant measurement unit, which in turn is rotatable. The internal conical recess in the rotatable component 30 is consequently rotatably arranged in the first base bracket 21. The mounting member 29 is also arranged so as to be fastened in the recess in the rotatable component 30 by means of a locking screw (not shown in FIG. 3) which is arranged to cooperate with a corresponding screw hole 31 in the centre of the cone-shaped mounting member 29. In this manner, the symmetrical axis of rotation of the cone-shaped recess in the rotatable mounting member 30 constitutes a fixed centre point during measurements with the invention. In particular, the entire support unit 28 (with its first measurement unit 6) can be turned about said axis of rotation so as to allow measurements to be provided at various rotational positions of the measurement unit 6. Due to the arrangement with the cone-shaped mounting member 29 and the corresponding recess, the mounting member 29 and the first measurement unit 6 is always correctly aligned to the centre of the cone-shaped recess in the rotatable mounting member 30.

FIG. 3 indicates the manner in which the first measurement unit 6 is mounted and fine-tuned before measurements with the invention. In a similar manner, the second measurement unit 8 is mounted by means of a further cone-shaped mounting member arranged to be mounted in a further cone-shaped recess in a corresponding rotatable mounting member 32 (see FIG. 2) provided in a further support unit, the second base bracket 26.

The fastening of the support unit 28 for the first measurement unit 6 (and the fastening of a corresponding support unit for the second measurement unit) does not have to be implemented by means of a cone-shaped element being inserted into an internal cone. This fastening can be made by means of any type of mounting which secures the support unit in fixed manner to the rotatable mounting member component 30 in the first bracket 21 (and a corresponding rotatable mounting member component 32 in the second bracket 26).

Consequently, both measurement units 6, 8 can be mounted in an easy and quick manner. The type of mounting of these units 6, 8 will then, as described above, allow rotation of the measurement units 6, 8 mounted within the respective conical recesses in the rotatable mounting members 30, 32.

The first measurement unit 6 is electrically connected to a display unit 33 via an electrical cable 34. In a similar manner, the second measurement unit 8 is electrically connected to the display unit 33 via a further electrical cable (not shown in FIG. 3). As indicated schematically in FIG. 3, the display unit 33 is provided with a display 35 which is arranged so as to present values representing the vertical angle, horizontal angle, vertical offset and horizontal offset between the two shafts.

The operation of the invention will now be described in greater detail. The invention is arranged in a manner so as to allow the first measuring unit 6 and the second measuring unit 8 to be mounted on the engine 1 and the pump 2, respectively, after which these two pieces of machinery are aligned in a first (or initial) state of operation, which is preferably a cold, non-operation condition of the engine 1 and the pump 2.

As will be described below, the invention is also adapted for aligning the engine 1 and the pump 2 in a second state of operation, which is preferably a hot, operative condition of the engine 1 and the pump 2.

Figure 4A:
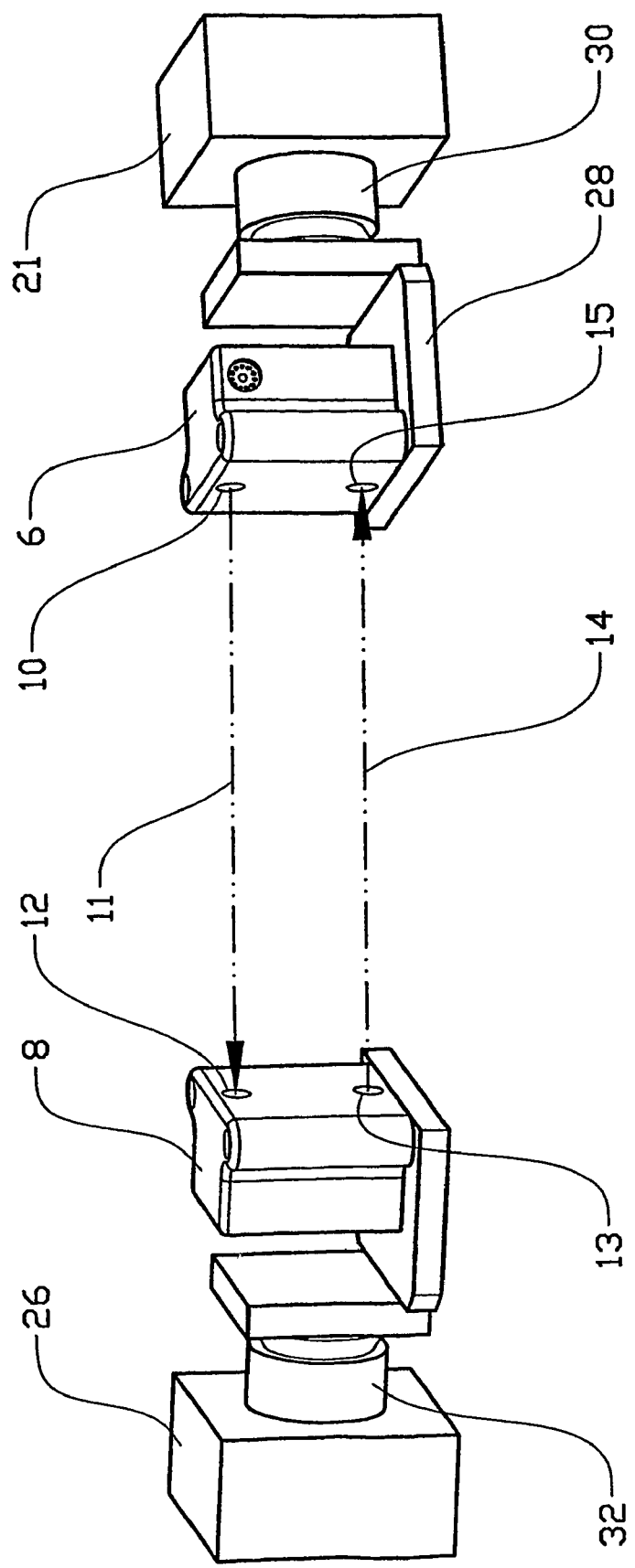
FIGS. 4a-c show how the measurement units can be moved between three different position for obtaining measurement values.
Figure 4B:
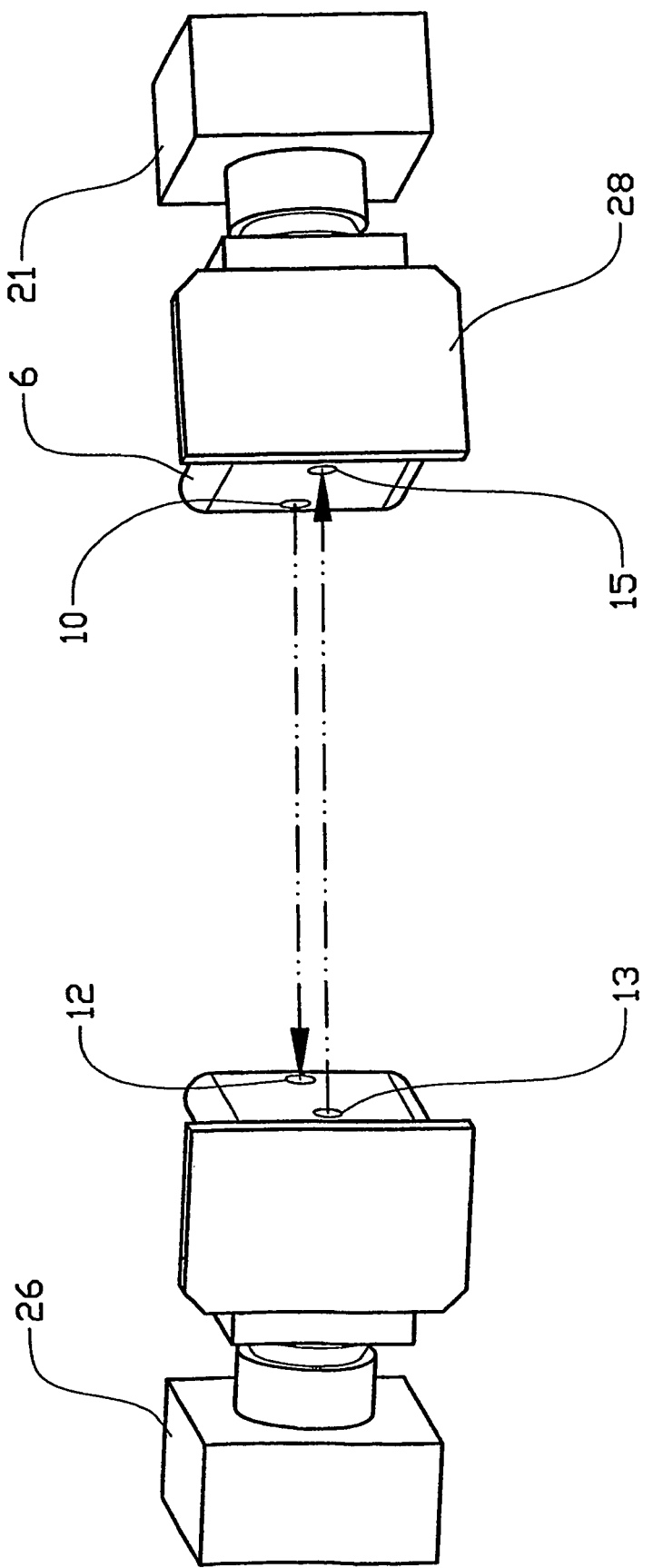
Figure 4C:
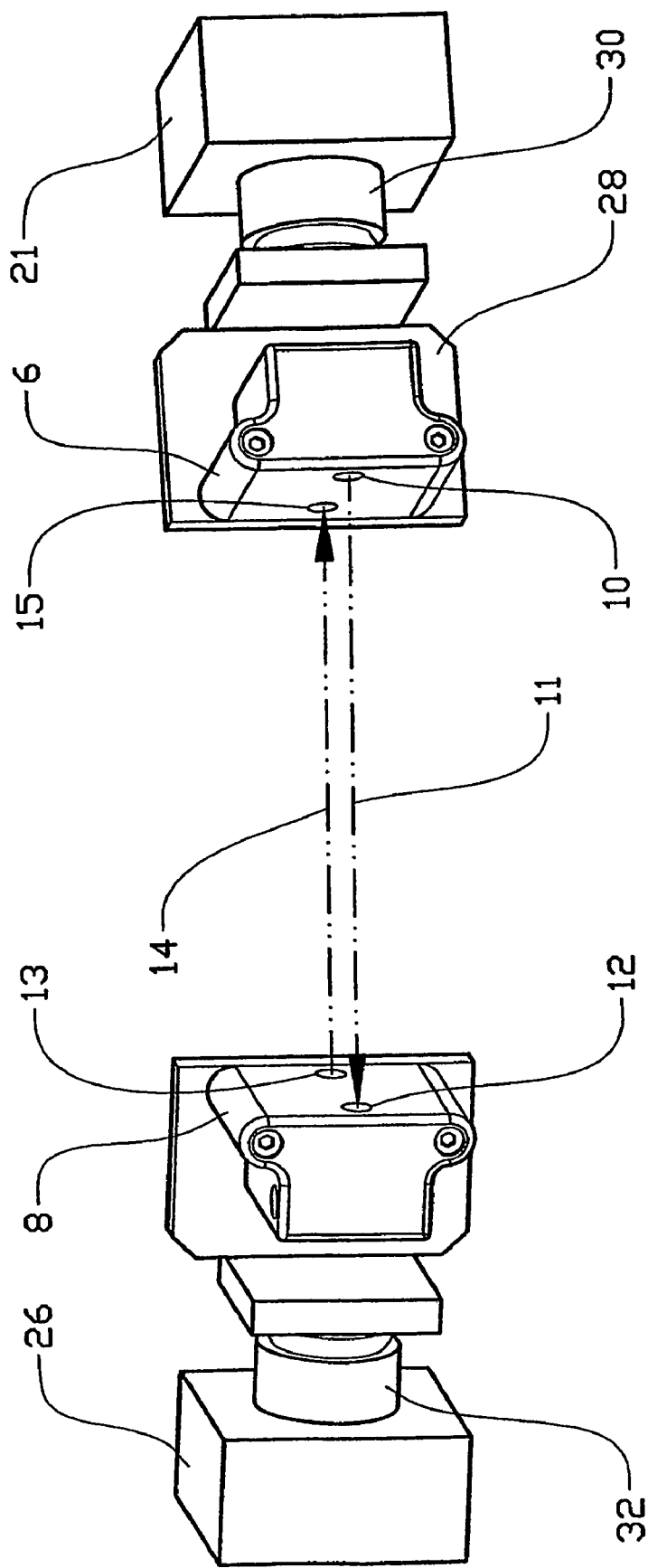

In the first state of operation, i.e. the cold condition according to the preferred embodiment of the invention, the horizontal angle, horizontal offset, the vertical angle and vertical offset are determined. In particular, these measurements are carried out by collecting an initial set of alignment readings in which the measurement units 6, 8 are positioned in three rotational positions in the respective base brackets 21, 26. The measurement unit 6 is then moved between these three positions. The three positions correspond to 9 o'clock, 12 o'clock and 3 o'clock according to the "clock method" or other known, suitable measurement methods. This is indicated in FIGS. 4a-c, which show the manner in which the measurement units 6, 8 are rotated in relation to their brackets 21, 26 during these measurements. In each of the three positions shown in FIGS. 4a-c, measurements are made as regards the position of the rotational axis being defined by the first measurement unit 6 being rotatably arranged in relation to the first bracket 21, and the position of the rotational axis being defined by the second measurement unit 8 being rotatably arranged in relation to the second bracket 26. In this manner, said initial set of alignment readings is provided.

The results of the above-mentioned readings are programmed into the display unit 33 and are used as a "reference" state, or "zero" setting, which consequently is related to the cold condition of the machines 1, 2. These initial readings from the display unit 33 correspond to the positions of the rotational shafts being defined in the first bracket 21 and the second bracket 26, respectively.

After measuring the errors in the cold condition, the engine 1 and pump 2 are started. When the machines 1, 2 are in their hot, operating conditions, the errors are measured once again. This second measurement of the errors is carried out in exactly the same manner as the first measurement. The results of the second readings are then stored in the display unit 33.

It should be noted that alignment readings can be collected at any time while the engine 1 is running. The measurement units 6, 8 can also be removed between readings (provided that the brackets are kept in their fixed positions) if this is desired.

If the initial bracket alignment readings were programmed into the display unit 33 as targets, the results displayed on the display unit 33 will reflect the change in the alignment condition of the machines as they progress from the cold to the hot condition. Consequently, the actual on-line changes in the alignment values can be measured while the machine is online under normal operating conditions. Information as regards the difference between the alignment in the cold and hot condition can thus be obtained by means of the invention.

Consequently, a first measurement is carried out in the cold condition and a second measurement is carried out in the hot condition. The differences in position are set at "target values" for the final shaft alignment procedure.

It can be noted that the invention constitutes a simple system which can be used with generally any laser-based alignment system for aligning two components, for example of the type as described above. By means of the invention, two imaginary axes (i.e. in the form of the above-mentioned first rotational axis and second rotational axis) are determined when the first component and the second component are in a first state of operation, which is normally a cold, still-standing state of operation. In this state of operation, the relative position of the first component in relation to the second component is determined by detecting the position of the first rotational axis and the second rotational axis. As mentioned above, this can be carried out by means of a laser alignment system comprising a first measurement unit in which a laser beam is guided to a light detector on a second measurement unit, and wherein a further laser beam (originating in said second measurement unit) is guided to a further light detector on said first measurement unit. This first measurement constitutes a reference for the cold state of operation.

Furthermore, when the first component and the second component is in a second state of operation (normally a hot, running state of operation), the positions of the two imaginary axes will be changed. In this state of operation, the invention is operated in a manner so that the positions of the first rotational axis and second rotational axis are once again determined by the same alignment system and are used so as to determine the relative position of the first component in relation to the second component. The change as resulting from the fact that the components being are their hot condition can then be determined. The positions of the first rotational axis and the second rotational axis are for example determined by using the "clock method", as described above.

The invention is not limited to the embodiment described above; but may be varied within the scope of the appended claims. For example, the invention can be used for measuring the alignment or relative positions between two components, in two or more distinct states of operations. The above-mentioned embodiment indicates two distinct states of operations (i.e. a cold and a hot condition) but the invention can be applied during measurements in any operational conditions, not just a "cold" and "hot" one.

With reference to the above-mentioned embodiment, in which two machines are aligned as they progress from a cold to a hot condition, it should be noted that alignment as they progress from a hot to a cold condition is also possible.

Generally, the invention can be used to determine the change in the relative position of a first component in relation to a second component. For example, the invention may thus be used for measuring the position of a machine in relation to its support structure. Also, the invention may be used for detecting the position of a ship engine in relation to its hull structure. Furthermore, the invention may be used for determining the relative positions of different components on a machine.

The invention claimed is:

1. Method for measuring the relative positions of a first component and a second component, said method comprising:
   mounting a first measurement unit on a housing forming part of said first component by means of a first bracket, said first measurement unit being rotatably arranged in relation to said first bracket and defining a first rotational axis;
   mounting a second measurement unit on a further housing forming part of said second component by means of a second bracket, said second measurement unit being rotatably arranged in relation to said second bracket and defining a second rotational axis,
   said measurement units being freely rotatable in said brackets to assume a variable number for respectively corresponding incremental rotational positions with respect to said brackets;
   measuring, in a first state of operation of said first component and said second component, the relative position of said first component in relation to said second component by detecting the position of said first axis and by detecting the position of said second axis in a selected number of said corresponding incremental rotational positions;
   providing measurement values corresponding to the positions of said first rotational axis and said second rotational axis;
   measuring, in a second state of operation of said first component and said second component, the relative position of said first component in relation to said second component by detecting the position of said first axis and by detecting the position of said second axis in a selected number of said corresponding incremental rotational positions;
   providing measurement values corresponding to the positions of said first rotational axis and said second rotational axis in each of said first and second states of operation; and
   utilizing said measurement values to provide an indication of variations between the relative positions of said first component in relation to said second component in said first state of operation and in said second state of operation.

2. Method according to claim 1, wherein said measurements are carried out for a first component in the form of a machine comprising an output shaft and a second component in the form of a second machine comprising an input shaft.

3. Method according to claim 1 or 2, wherein said first state of operation is constituted by a cold, non-operating condition of said components and said second state of operation is constituted by a hot, operating condition of said components, said first and second components being operated so that they progress from said cold condition to said hot condition, or vice versa.

4. Method according to claim 1 or 2, wherein the measurement values are obtained, in both the first state of operation and said second state of operation, by rotating the measurement units between different positions in which measurement values are registered.

5. Method according to claim 1 or 2, wherein said measuring the relative positions in said first state of operation and said second state of operation is carried out by:
   operating a source of light on said first measurement unit, said light being detected by means of a detector unit on said second measurement unit; and
   operating a source of light on said second measurement unit, said light being detected by means of a detector unit on said first measurement unit.

6. Method according to claim 1 or 2, wherein said measuring the relative positions in said first state of operation and said second state of operation is carried out by:
   operating a source of light on said first measurement unit, said light being reflected by means of a reflector unit on said second measurement unit; and
   detecting said light by means of a detector unit on said first measurement unit.

7. Method according to claim 1 or 2, wherein said measuring the relative positions in said first state of operation and said second state of operation is carried out by operating a mechanical dial indicator.

8. Apparatus for measurements of the relative positions of a first component and a second component using a first measurement unit and a second measurement unit, said apparatus comprising:
   a first bracket for mounting the first measurement unit on a housing forming part of said first component;
   a second bracket for mounting the second measurement unit on a further housing forming part of said second component; and each measurement unit being fixedly mounted on a rotatable element which is arranged to freely rotate and assumes variable increments of rotation in each corresponding bracket, thereby defining a first rotational axis for the first measurement unit in relation to the first bracket and a second rotational axis for the second measurement unit in relation to the second bracket at respectively corresponding incremental rotational positions in said brackets; wherein said measurement units are adapted for measuring, in a first state of operation of said first component and said second component, the relative positions of said first component in relation to said second component by detecting the position of said first axis and by detecting the position of said second axis in a selected number of said corresponding incremental rotational positions, and said measurement units are adapted for measuring, in a second state of operation of said first component and said second component, the relative positions of said first component in relation to said second component by detecting the position of said first axis and by detecting the position of said second axis in a selected number of said corresponding incremental rotational positions.

9. Apparatus according to claim 8, wherein said first component is constituted by a first machine comprising an output shaft and said second component is constituted by a second machine comprising an input shaft.

10. Apparatus according to claim 8 or 9, wherein each measurement unit is arranged so as to assume different rotational positions with respect to each corresponding bracket, during measurements for obtaining measurement values related to the positions of said first rotational axis and said second rotational axis.

11. Apparatus according to claim 8 or 9, wherein
said first measurement unit comprises a source of light;
said second measurement unit comprises a detector for said source of light;
said second measurement unit comprises a further source of light; and
said first measurement unit comprises a detector for said further source of light.

12. Apparatus according to claim 8 or 9, wherein
said first measurement unit comprises a source of light;
said second measurement unit comprises a reflector for said light; and
said first measurement unit comprises a detector for the light reflected on said reflector.

13. Apparatus according to claim 11, wherein said sources of light comprise laser light sources.

14. Apparatus according to claim 8 or 9, wherein said first measurement unit and said second measurement unit each comprise a mechanical dial indicator.

15. Apparatus according to claim 8 or 9, wherein said measurement units are adapted for communicating with a display unit for displaying obtained information related to the measurements made in said first and second states of operation.

16. Apparatus according to claim 12 wherein said sources of light comprise laser light sources.

* * * * *